United States Patent
Mazzarelli et al.

[15] 3,693,993
[45] Sept. 26, 1972

[54] BEACH TOTE CART
[72] Inventors: Peter Mazzarelli; Jean Volpe, both of 476 West Main St., Huntington, N.Y. 11473
[22] Filed: Jan. 5, 1971
[21] Appl. No.: 104,099

[52] U.S. Cl. .................. 280/30, 280/47.18, 297/118
[51] Int. Cl. ............................................. B62b 1/12
[58] Field of Search ..280/30, 47.18, 47.31; 297/118, 297/130; 5/111, 112

[56] References Cited

UNITED STATES PATENTS

| | | |
|---|---|---|
| 2,967,058 | 1/1961 | Hoffmann, Jr. ......... 297/130 X |
| 2,840,142 | 6/1958 | Haug ................. 280/47.18 X |
| 3,309,134 | 3/1967 | Roberts ..................... 297/17 |
| 3,263,880 | 8/1966 | Clement .................. 224/29 R |

Primary Examiner—Gerald M. Forlenza
Assistant Examiner—Frank E. Werner
Attorney—Carl Miller

[57] ABSTRACT

A convertible cart for beach use, the device including a frame work of a pair of frames hinged together for pivoting in either direction so that the cart can serve either as a cot or lounging chair, the frames supporting webbling areas therein, each of the frames being supportable in elevated position above the ground by downwardly pivotable legs, and one end of the framework forming a convenient pull handle while the other end is supported on a rollable cylinder for travelling over the ground.

2 Claims, 4 Drawing Figures

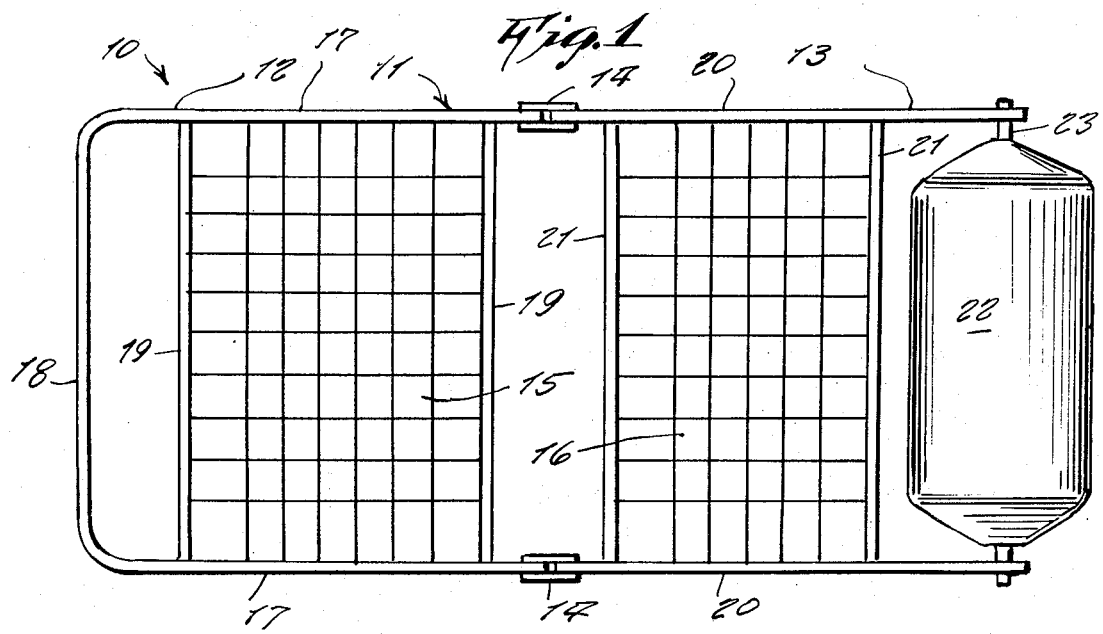
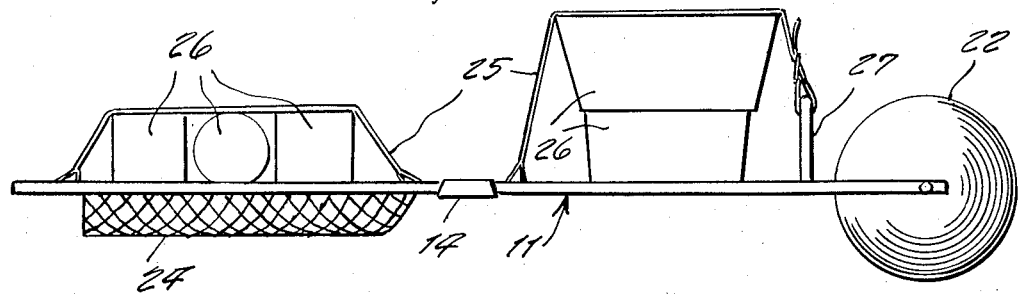
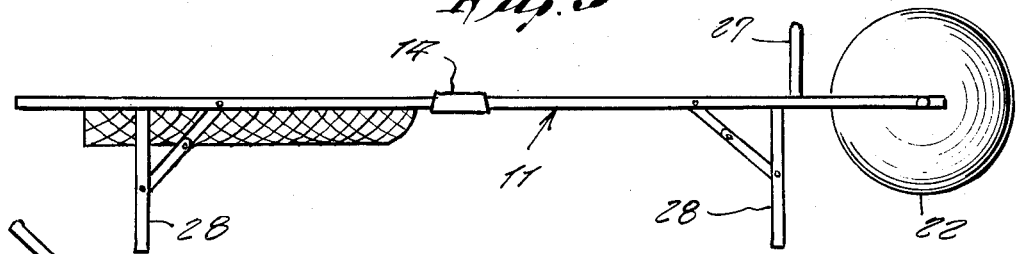
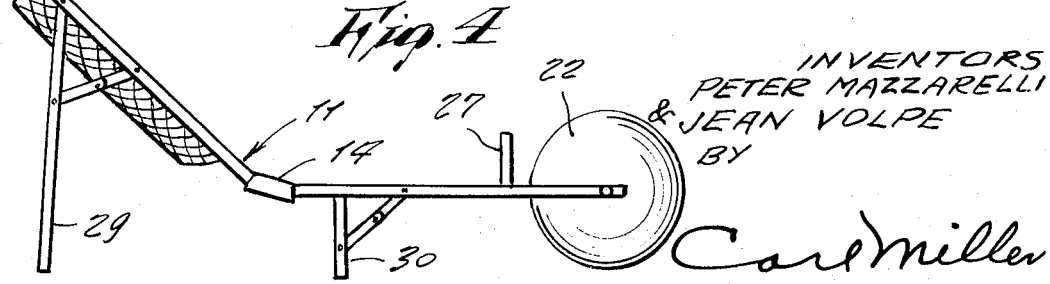
INVENTORS
PETER MAZZARELLI
& JEAN VOLPE
BY
Carl Miller
ATTORNEY

BEACH TOTE CART

This invention relates generally to manually pullable carts.

A principal object of the present invention is to provide a cart for handling over the beach sand and which can transport various picnic and bathing equipment, so to eliminate the necessity of all persons in a party to struggle by lugging items over long distances.

Another object is to provide a beach tote cart which is readily foldable so that it can be transported in an automobile between a person's dwelling and a beach.

Another object is to provide a beach tote cart which is readily convertable for forming either a longing chair or a cot for persons to sun themselves thereupon in reclining positions.

Other objects are to provide a beach tote cart which is simple in design, inexpensive to manufacture, rugged in construction, easy to use and efficient in operation.

These and other objects will be readily evident upon a study of the following specification and the accompanying drawing wherein:

FIG. 1 is a top plan view of the invention.

FIG. 2 is a side view thereof adjusted to serve as a cart.

FIG. 3 is a side view thereof adjusted to serve as a lie down cot.

FIG. 4 is a side view thereof adjusted to serve as a lounging chair.

Referring now to the drawing in detail, the reference numeral 10 represents a BEACH TOTE CART according to the present invention wherein there is a framework 11 comprised of a pair of individual frames 12 and 13 which are attached pivotably together at their one ends about hinges 14; each of the frames supporting a nylon fabric woven webbing panel 15 and 16 respectfully upon which a person may rest or recline.

One of the frames 12 is of U-shaped and comprised of parallel spaced apart arms 17 which at their one end are interconnected by a cross arm 18 that serves as a convenient handle for pulling the cart. Cross bars 19 between the arms provide rigidity and also support the webbing panel 15. The other frame 13 is comprised of longitudinal spaced apart parallel arms 20 with cross bars 21 therebetween for likewise giving rigidity and supporting the webbing panel 16.

The frames with their integral cross arms are made of lightweight aluminum tubing, such as conventional outdoor furniture.

A rollable cylinder 22 is supported on shaft 23 between arms 20, the cylinder being made of light strong plastic that is tapered at its two ends as shown in FIG. 1. The cylindrical face of the cylinder 22 may be dimpled, roughened or corrugated for better traction. It may be made solid or inflatable for easier storage, as desired by a manufacturer. The cylinder is removable.

A soft, strong mesh pocket 24 is attached to the underside of the frame 12 and which may be utilized for small miscellaneous articles to be transported.

Adjustable straps 25 are provided for securing various objects 26 upon the cart while traveling; a guard 27 being rigidly formed upright on the frame 13 so to prevent the objects 26 to shift position by resting thereagainst, when the cart is tilted.

In operative use, the device can be used as a cart by securing the frames in a flat position. By lowering a pair intermediate length legs 28 from the frames, the device can be used as a horizontal cot. By setting the hinge at an angle position shown in FIG. 4, and pivoting downward a pair of long legs 29 and a pair of short legs 30, the device can be used as a lounging chair. It is understood that the hinges are of a type that can be set at the various desired angles, and made rigid when the frames are in a flat plane for use as a cart. Winged nuts are employed for easy removal of the cylinder shaft from the frame.

While certain novel features of our invention have been shown and described and are pointed out in the annexed claims, it will be understood that various omissions, substitutions and changes in the forms and details of the device illustrated and in its operation can be made by those skilled in the art without departing from the spirit of the invention.

What we claim as new and desire to secure by U.S. Letters Patent is:

1. In a beach tote cart, the combination of a framework comprised of a pair of frames attached pivotally together at their one end by hinges, each frame being made of tubular aluminum and supporting a nylon fabric webbing panel, the end of one frame forming a handle, and the opposite end of the other frame being supported on a cross shaft mounted through a rollable cylinder, said cylinder being comprised of tough plastic material, the cylindrical side of which is dimpled, roughened or corrugated for traction on sand surface, said frames being provided with pairs of downwardly pivotable intermediate length legs so to form a cot, and pairs of long and short legs so to form a lounge chair; said hinges of said framework being adaptable to be set rigid for retaining said frames in a desired relationship to each other.

2. The combination as set forth in claim 1 wherein a mesh pocket is secured to an underside of said framework.

* * * * *